(12) United States Patent  (10) Patent No.: US 9,068,904 B2
Parks et al.  (45) Date of Patent: Jun. 30, 2015

(54) SYSTEM AND METHOD FOR NON-CONTACT METROLOGY OF SURFACES

(75) Inventors: Robert E. Parks, Tucson, AZ (US); Robert A. Smythe, Middleton, CT (US); Peng Su, Tucson, AZ (US); James H. Burge, Tucson, AZ (US); Roger Angel, Tucson, AZ (US)

(73) Assignee: Arizona Board of Regents on Behalf of the University of Arizona, Tuscon, AZ (US)

( * ) Notice: Subject to any disclaimer, the term of this patent is extended or adjusted under 35 U.S.C. 154(b) by 509 days.

(21) Appl. No.: 13/353,110

(22) Filed: Jan. 18, 2012

(65) Prior Publication Data

US 2012/0293808 A1 Nov. 22, 2012

Related U.S. Application Data

(60) Provisional application No. 61/461,246, filed on Jan. 18, 2011, provisional application No. 61/571,976, filed on Jul. 8, 2011.

(51) Int. Cl.
*G01B 11/24* (2006.01)
*G01M 11/00* (2006.01)
*G01M 11/02* (2006.01)
*G01B 11/25* (2006.01)

(52) U.S. Cl.
CPC ........ *G01M 11/005* (2013.01); *G01M 11/0264* (2013.01); *G01B 11/2513* (2013.01)

(58) Field of Classification Search
CPC ................. G01N 21/8806; G01N 2021/1765; G01N 2021/416; G01N 21/41; G01N 2021/8819; G01N 2021/8887; G01N 21/9515; G01B 11/2527; G01B 11/2531; G01B 11/2536; G01B 11/303; G01B 11/16; G01B 11/25

See application file for complete search history.

(56) References Cited

U.S. PATENT DOCUMENTS

| 4,291,990 | A | * | 9/1981 | Takasu | 356/445 |
| 5,187,539 | A | * | 2/1993 | Adachi et al. | 356/124 |
| 7,430,049 | B2 | * | 9/2008 | Bertin-Mourot et al. | 356/605 |
| 7,869,061 | B2 | * | 1/2011 | Sato et al. | 356/610 |
| 2008/0094616 | A1 | * | 4/2008 | Tanaka | 356/237.2 |
| 2009/0141287 | A1 | * | 6/2009 | Sato et al. | 356/610 |

* cited by examiner

*Primary Examiner* — Michael P Stafira
(74) *Attorney, Agent, or Firm* — Michael J. Donohue; Davis Wright Tremaine LLP

(57) ABSTRACT

A non-contact metrology system utilizes a display that can be programmed with a plurality of targets. The display targets shine on a specular surface and the reflected targets are detected by an imaging device. Based on the display pattern and the expected location of the reflected pattern, it is possible to characterize the reflective surface. The displayed pattern can be a regular array of targets and the reflected pattern detected by the imaging device is an irregular display of targets whose locations are based on the particular display pattern, the location of the display system and imaging device and the nature of the surface. Deviations of the actual location of targets from the expected location of targets is indicative of unexpected variations in the surface. Alternatively, the display has an irregular pattern of targets such that the reflected signals result in a regularly spaced array detected by the imaging device.

54 Claims, 8 Drawing Sheets

SYSTEM AND METHOD FOR NON-CONTACT METROLOGY OF SURFACES

ACKNOWLEDGEMENT OF FEDERAL FUNDING

Particular aspects of the present disclosure were, at least in part, supported by a grant from the United States Department of Commerce, Grant No. 60NANB10D010 from the National Institute of Standards and Technology and the United States Government therefore has certain rights in the invention.

BACKGROUND OF THE INVENTION

1. Field of the Invention

The present disclosure relates generally to optics and, more specifically, to a system and method for the measurement of surfaces.

2. Description of the Related Art

The prior art can be said to go back to Hero of Alexandria (AD circa 10-70) who wrote up his observations about reflection. More recently, precision optics have been tested using the same law with the invention of the Foucault knife edge test in 1858 that is used to determine a profile of a mirror. More recently there are related tests such as the wire test, the Ronchi test that effectively uses a regular grid of wires to measure the slopes of surface in one direction at a time.

A two dimensional version of these slope measuring tests is the Hartmann test dating from 1900. With the availability of lens arrays and electronic cameras the modern version is the Shack-Hartmann test described in 1971.

A related technology called deflectometry was described by Ligtenberg in 1954 for measuring the deflections in plates, and that method has been improved over the years to the point where it can measure surface height variations at the nanometer (nm) level by measuring slopes as reported by Jueptner and Bothe in 2009. In these cases a pattern of stripes is programmed on the screen first horizontally and then vertically in order to measure the slope in both directions, something that is necessary to determine the complete surface topography. This paper describes using sinusoidally varying stripes in terms of intensity that can be phase shifted so the slope information can be obtained using the same phase shifting algorithm as used in interferometry. Peng (2010) describes another technique using square wave stripes rastered on the screen and capturing an image of each stripe and then finding the centroids of the crossing points in computer processing of the data to find the slope in both directions. He applied the method to the testing of large astronomical mirrors to the tens of nm level.

In addition to having to measure the slope in two orthogonal directions, there must be information in the data about how far the surface is from the screen and camera. Haeusler, U.S. Pat. No. 7,532,333, points out that there are an infinite number of surfaces that can be fit through a series of measured slopes. His patent describes using two cameras and triangulation to determine the needed distance to establish the precise surface being measured. In precision optics this distance can be determined by independent means so only one camera and screen are necessary to determine the surface.

As mentioned above, the programmable metrology screen technology may be applied to refractive systems as well. U.S. Pat. No. 6,616,279 gives an example of another type of technology where the refractive system is the human eye and a reflective device is used to interrogate the light refracted by the eye.

BRIEF DESCRIPTION OF THE SEVERAL VIEWS OF THE DRAWING(S)

DETAILED DESCRIPTION OF THE INVENTION

The measurement techniques disclosed herein are useful in a variety of applications. For ease in understanding, the examples presented herein are illustrated for a specular surface. That is, measurements are made on a surface on which light is reflected. Those skilled in the art will appreciate that conventional optical laws, such as the angle of incidence equals the angle of reflection, will apply to the measurement process. However, the same techniques may be readily applied to optically transparent surfaces, such as lenses, where the incident light beam is refracted.

The examples presented herein may be readily understood with respect to certain surfaces, such as astronomical telescopes where a parabolic surface (or other shape) has a mirrored surface to reflect incident light. However, the principles herein are applicable to other lenses, such as ophthalmic lenses (e.g., progressive lenses), camera lenses (e.g., cell phone camera lenses), and the like. In addition, the measurement systems may be used to characterize the surface of an automobile, an aircraft, or the like. Those skilled in the art will appreciate that the non-contact metrology system disclosed herein may be used to characterize any specular surface or transmissive surface.

Figure 1:
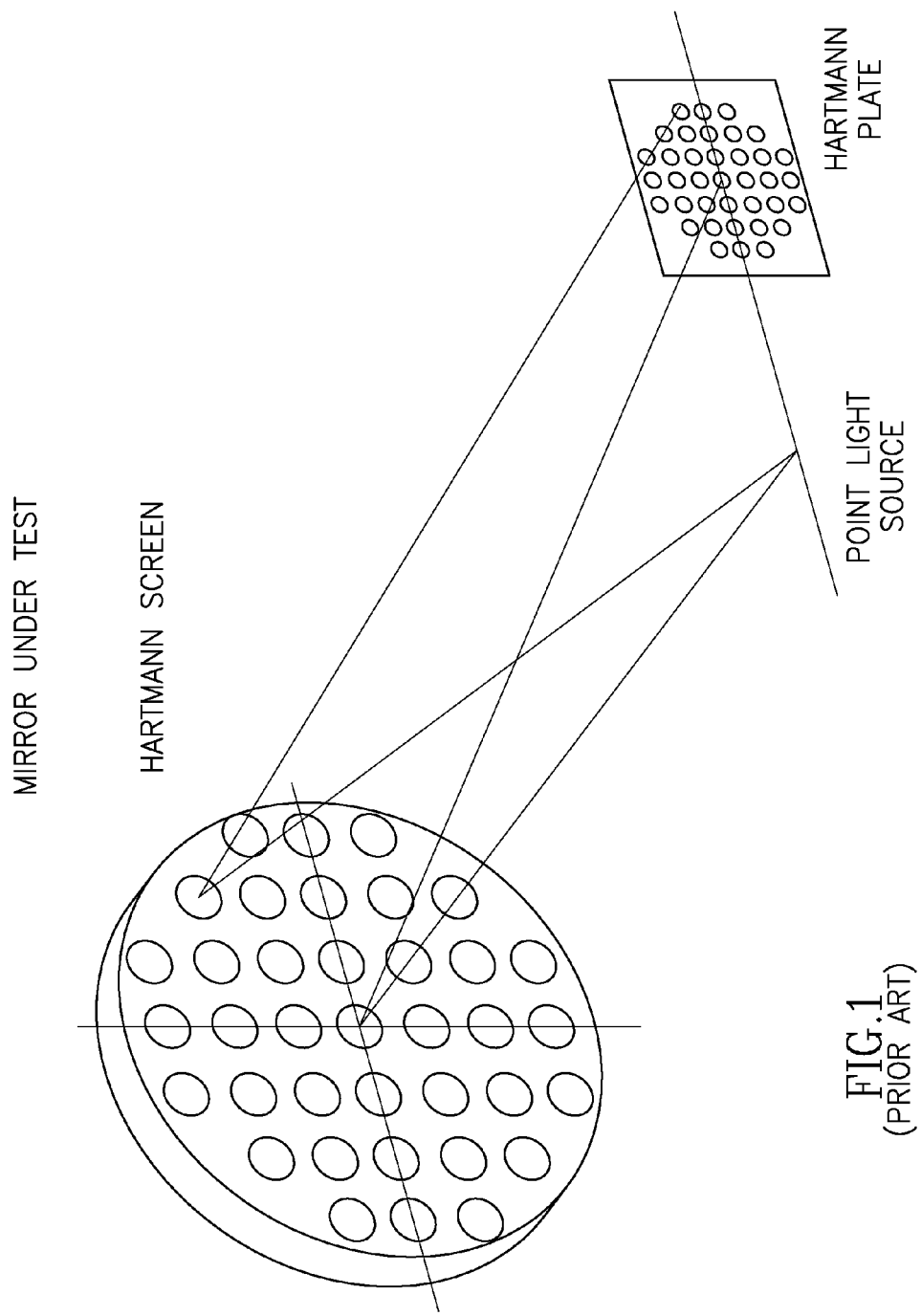
FIG. 1 is a schematic illustration of the Hartmann test using a known technology.

The invention is most easily visualized by considering the Hartmann test for precision optics and then illustrating how the metrology of the present disclosure differs from the Hartmann test. In the Hartmann test, illustrated in FIG. 1, a point source of light is placed at the center of curvature of a concave mirror. In front of the mirror is a mask of regularly spaced holes that let the light hit the mirror and reflect back toward the point source of light. Before the light returning from the holes in the mask can come to focus, a photographic plate or other light detector records the spots of light. If the mirror were perfectly spherical the reflected spots would form a perfectly regular grid of points. If there were errors in the topography of the mirror surface, the reflected spots would depart from regular spacing and the degree to which they were irregularly spaced indicates the location and magnitude of an irregularity on the surface.

Figure 2:
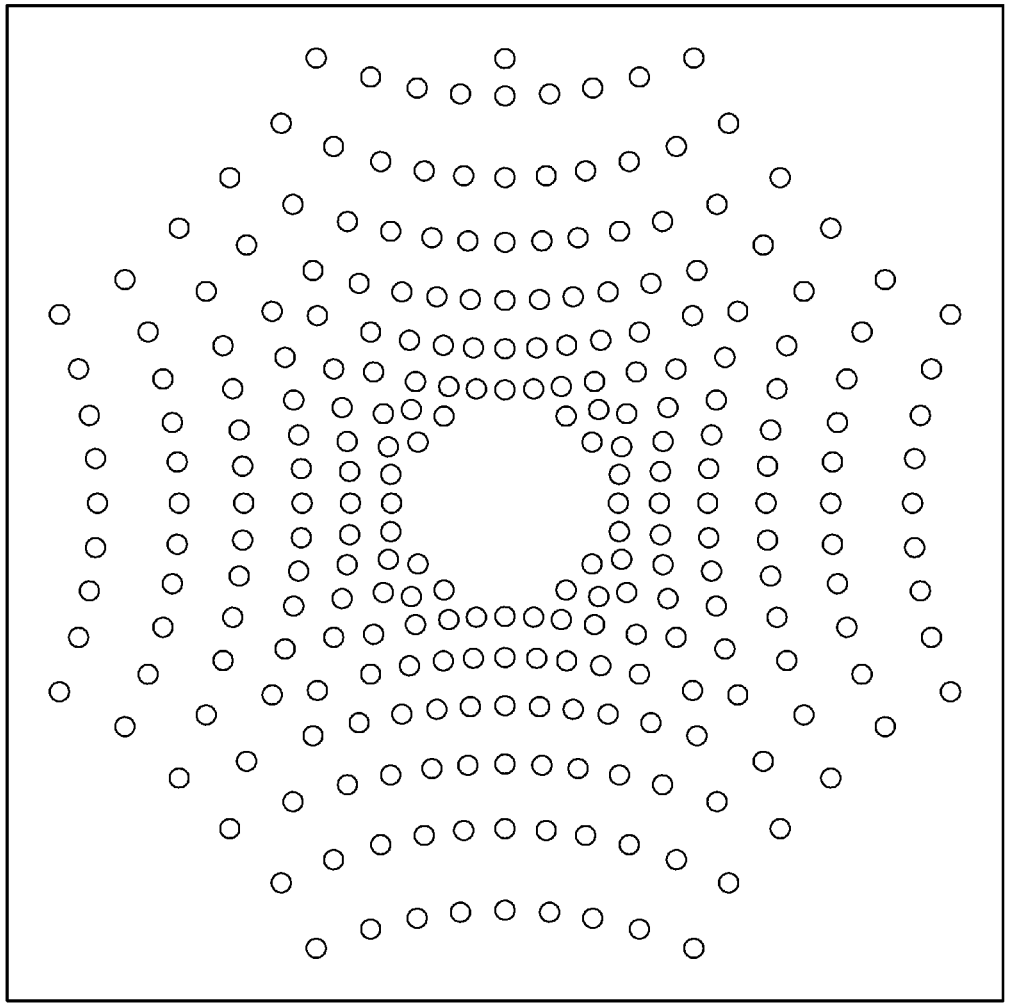
FIG. 2 illustrates the light spot pattern produced by a regular array of holes in a mask in front of a parabola using the procedure of FIG. 1.

With the programmable metrology screen method of the present disclosure, a programmable display screen takes the place of the photographic plate or light detector, while the point source of light is replaced by the aperture stop of the camera lens recording the reflections. Thus, in the case of a sphere where the programmable screen is slightly inside or outside the center of curvature but the camera is at the center of curvature, a perfectly regular array of points on the screen will be seen as a perfectly regular array of points reflected from the mirror surface. If the mirror was paraboloidal instead of spherical and an irregular pattern of points as in FIG. 2 were displayed on the screen, the reflected pattern would be perfectly regular indicating a perfect paraboloid. The light spot pattern in FIG. 2 is produced by a regular array of holes in the Hartmann screen in front of a parabola. The lack of spots in the center of the display in FIG. 2 is caused by a hole in the center of the mirror under test.

Figure 3A:
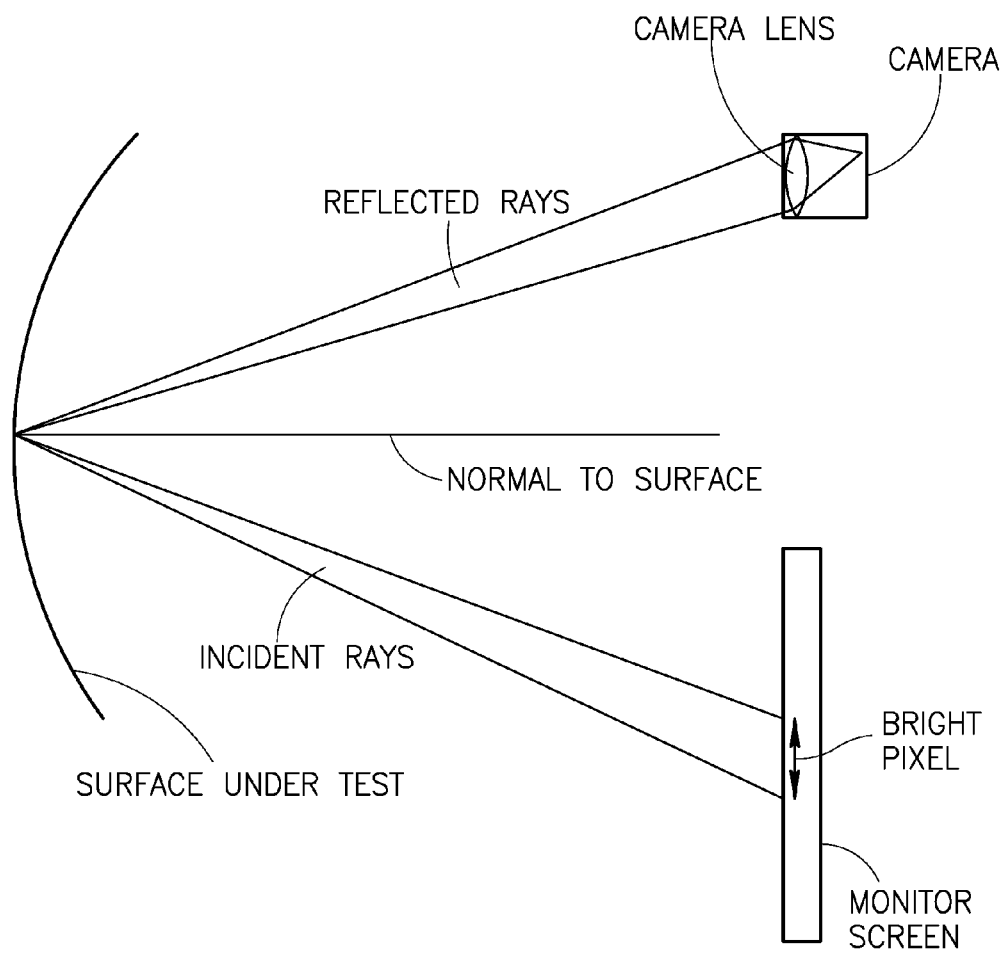
FIG. 3A illustrates an example embodiment of the present disclosure for a reflective surface.

FIG. 3A illustrates an example embodiment of the non-contact metrology system for a reflective surface. In accordance with the present disclosure, a display screen can be programmed to display a series of targets. In the examples presented herein, the targets are circular and may be referred to as points, dots, or spots. However, those skilled in the art will appreciate that any convenient form of targets, such as squares, rectangles, circles, triangles, and the like, may be readily used as the targets. The targets are displayed in two dimensions with the targets separated from each other in two dimensions. The present disclosure is not limited by the specific shape of the targets. In the present disclosure, a display screen can be programmed to display a pattern of spots that, when reflected by a perfect mirror, corresponding to the optical prescription of the mirror, result in a pattern of spots reflected by the mirror and captured by the camera that will be regularly spaced. The more spots there are in the pattern, the higher the spatial frequency of sampling the surface and the higher the sensitivity to localized slope errors. For example, equation 2.29 in the Korsch book, Reflective Optics, (1991) tells how to calculate the pattern of spots to be programmed onto the screen so that they will appear as a regular grid on any continuous surface that can be described analytically and has a first derivative. Obviously the surface cannot curve so far that parts of the surface cannot be seen by the camera, but otherwise the formula is exact and completely general. While the equation in Korsch provides a convenient technique for determining the location of spots to be programmed onto the display screen, there are a number of known techniques for generating such data. For example, lens design programs, such as Zemax or CodeV, can be used for this purpose. Matlab or other computational software can also be used to determine the position of the spots on the display screen. Whenever a person designs a surface, there is a resultant series of x, y, and z coordinates. This data can be provided to the programs described above or used in the Korsch equation to determine the precise pattern of spots on the display screen. Those skilled in the art will appreciate that the position of the display screen and the imaging device with respect to the surface being measured must also be known.

The use of spots on the screen rather than stripes improves two aspects of the process over the traditional slope methods of using stripes or linear arrays of lines. First, it allows slope data in both orthogonal directions to be gathered simultaneously and it allows a pattern of spots to be displayed that will lead to a perfectly regular array of spots on a surface that is identical to the formula used to create the pattern in the first place. Neither of these can be done with stripes.

Next, it can be appreciated that the pattern of dots on the surface being tested could become ambiguous if the surface has errors sufficiently large that a spot is moved over by a whole row of spots or more. This is analogous to aliasing, or exceeding the Nyquist limit, or false resolution. To keep track of which spots on the surface correspond to which spots on the screen something can be done that is analogous to what is done in traditional deflectometry, the pattern is first displayed very coarsely so there is no ambiguity and then the stripes made narrower to give better spatial resolution. The same thing can be done with the spots. A coarse pattern first that is made progressively finer so there is no ambiguity. This, however, takes additional time.

In accordance with the present disclosure, it is possible to eliminate the ambiguity without resorting to a course pattern that is made progressively finer. Thus, the measurement process is significantly streamlined. As described herein, the spots are encoded, or multiplexed for instance by color or other means obvious to one skilled in the art. The screen uses a spectrum of colors for the pattern of spots since it is a color display. By the same logic, the camera can sort the spots by color to maintain the one-to-one mapping of spots on the screen to those on the surface. Note this is a far larger range of colors than the simple red, green and blue of the individual pixels. By choosing the saturation of the colors in the pixels a vast array of colors can be created on the screen and distinguished by the camera. This permits high spatial resolution on the surface being tested using just one image of the surface with its reflected spots without any ambiguity. Thus a complex surface can be measured in one image using a combination of the color coding and the two dimensional information contained in the spots rather than stripes. In addition to color-coding, the targets can be coded to avoid ambiguity using intensity coding, coding using different spot sizes or shapes or through the use of unique motions of the spots.

A further teaching of the present disclosure is the idea of non-null testing. As mentioned above, if the surface being tested is spherical, a regular pattern of points on the screen will appear as a regular grid on the surface. If it is anything other than a sphere, the surface will appear to have an irregular array of spots for a regular array on the metrology screen. In interferometric optical testing, a null lens, or optic such as a hologram, is used to turn the return reflection into a spherical wavefront. However, null optics are expensive to make and can only be used for the particular mirror or surface for which they were designed. With the programmable metrology screen any non-spherical surface can be tested by programming the correct pattern on the screen. This design of the pattern for the screen is no more difficult to design than the null optic, yet when the design is done the programmable screen is ready to test the surface in question without manufacturing and assembling a null optic.

Another aspect of this invention is the use of the slope data in the pattern of spots on the surface being tested to do real time alignment. There are six unique vector polynomials described in papers by Zhao and Burge (2007 and 2008) that account for the six degrees of rigid body motion of any solid body. The magnitudes of these six polynomials are directly related to how far the surface is misaligned relative to the pattern of spots on the display screen that represents the desired surface topography. This invention teaches that these six coefficients representing the magnitudes of the polynomials can be used to either reposition the surface in six degrees of freedom, or, in the preferred implementation, change the pattern of spots on the screen to account for the misalignment. In other words, the alignment is strictly automatically reprogramming the pattern of spots to match the surface in its misaligned position. This eliminates the need to physically move the surface with the obvious savings of time and hardware required to make the adjustment of the physical surface.

Figure 4:
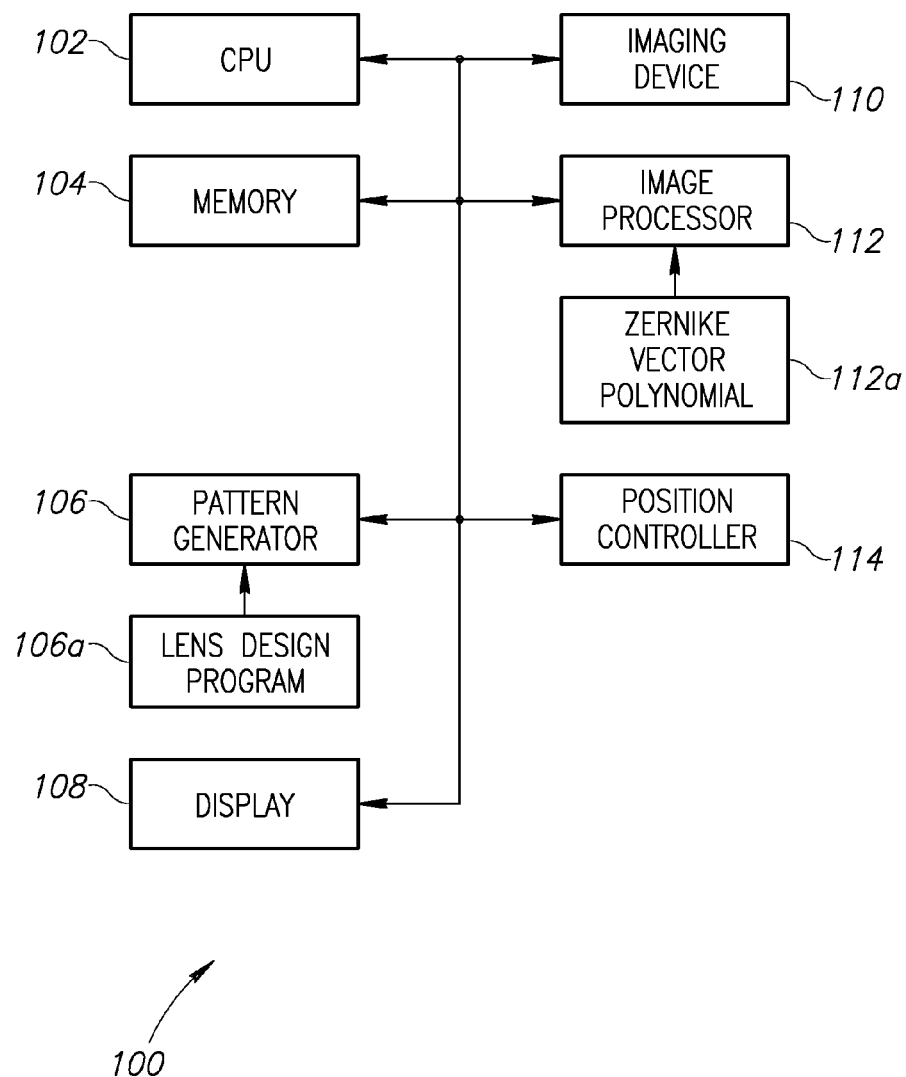
FIG. 4 is a functional block diagram of a system used to perform the measurements of the present disclosure.

FIG. 4 is a functional block diagram illustrating a combined pattern generation system and pattern image analysis system. Those skilled in the art will appreciate that these two processes can be separated in time with the pattern generated by a first computer and the image analysis performed by a second computer. For the sake of convenience in discussion, both processes are illustrated in FIG. 4 as executed by a single processor. A system 100 has a central processing unit (CPU) 102 and a memory 104. The central processing unit may be implemented by any number of conventional technologies. Similarly, the memory may comprise random access memory, read only memory, flash memory, and the like. The system 100 is not limited by the specific implementation of the CPU 102 and memory 104.

A pattern generator 106 is used to calculate the pattern of spots shown on the display 108. The pattern generator 106 may include a lens design program 106a. The display 108 may be a conventional computer monitor. However, measurement of large surfaces may require the use of an external monitor, such as a large flat screen television display with computer interface capability.

The operation of the pattern generator 106 has been described above with respect to the Korsch equation or other lens design or software programs to determine the location of the spots on the display 108. In one embodiment, the pattern generator 106 can generate an array of spots on the display 108 such that the spots are shown in a regularly spaced pattern. In this embodiment, the individual spots from the display 108 are reflected off the surface under test and detected by an imaging device 110. In a typical embodiment, the imaging device 110 may be a CCD array. However, other conventional imaging devices may also be used. In the example described above, where the display 108 has a regularly spaced pattern of spots, the imaging device 110 may detect an irregularly spaced pattern of spots reflected off the surface. The precise expected location of the reflected spots in this example can be readily determined using the Korsch equation or other program described above. This approach has the convenience of simple programming of the array on the display 108.

In another embodiment, the display 108 itself is programmed with an irregular array of spots such that the reflected pattern is detected by the imaging device 110 as a regularly spaced array of spots. This approach is essentially the reverse of the process described above. This approach has the advantage of easy detection of abnormalities on the surface being measured since an abnormality will be easily detected when one or more of the spots is not in the regularly spaced position on the display.

An image processor 112 can compare the actual location of spots detected by the imaging device 110 and the expected location of the spots (in the regularly spaced array or in an irregularly spaced array). The image processor 112 can determine the degree of error in the surface based on the deviation (amount in location of the actual location of the spots compared with the expected location of the spots). In one embodiment, the image processor 112 can use a Zernike vector polynomial 112a for analysis.

In another aspect, the system is capable of measuring large surfaces or aspherical surfaces by changing the position of the measurement system. A position controller 114 controls the position of the measurement system with respect to the surface under measurement. This process is discussed in greater detail below.

Figure 5:
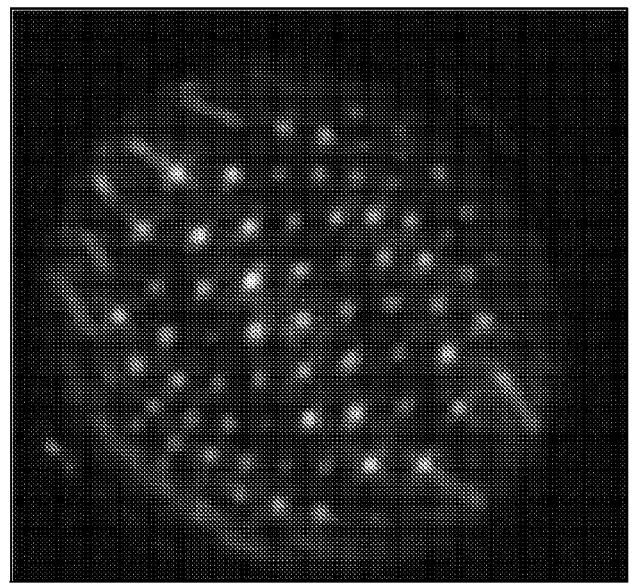
FIG. 5 is an example of the detected target array following interaction with the surface under measurement.

FIG. 5 is an example of an output image from the imaging device 110 reflected from a toroidal surface with a regularly spaced pattern of targets on the display 108.

Figure 6:
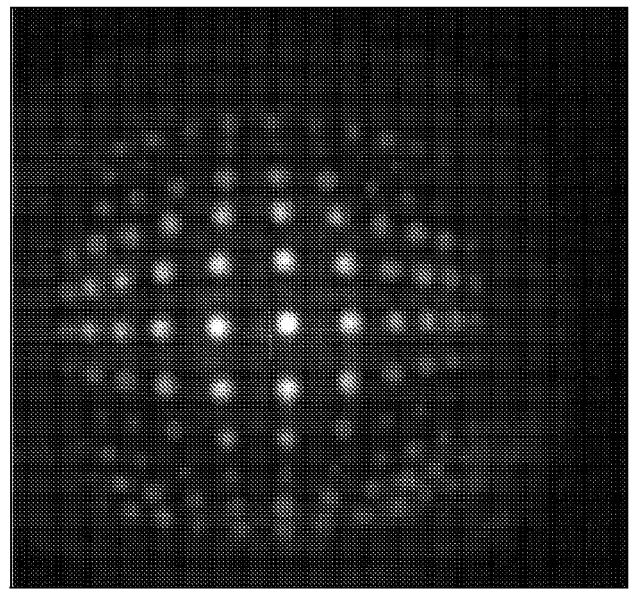
FIG. 6 is another example of the detected target array following interaction with the surface under measurement.

FIG. 6 is another example of an output image from the imaging device 110. In the example of FIG. 6 the output image from the imaging device 110 is reflected from a rotational symmetric asphere with a regularly spaced pattern of targets on the display 108.

In another aspect, the measurement system described herein permits the determination of an arbitrarily shaped surface whose topography is not known a priori. In this case, one point on the surface must be a predetermined distance from the display screen or imaging device. This can be accomplished by bringing the surface up to a physical stop of known position. Once this is done, one spot at a time can be displayed on the screen and moved on the screen until it is at a desired location on the surface, say the center. A second spot on the screen can then be moved until it appears a fixed distance from the first spot in the x dimension. Then a third spot is moved until it appears at the same fixed distance from the first spot in the y dimension. The speed at which the spot appears to move on the surface is an indication of the slope of the surface at that point and can be used as feedback to the algorithm that moves the spot on the screen.

By this method of adding a spot at a time to the screen in a way to form a regular grid of points on the surface not only establishes the topography of the surface being tested but provides a template for the pattern used to compare or measure further parts of the same geometry. This "smart" measurement of surfaces is a means of measuring and describing surfaces that are difficult to describe analytically. Of course, the pattern for such a surface is likely to be complex so advantage would be taken of full use of color coding described above. This means that a number of points of different colors could be displayed on the screen and that they could all be moved simultaneously to produce a uniform grid on the surface being measured. To increase the spatial frequency of the sampling of the surface more spots would be added to the pattern on the screen.

The invention can be configured in multiple configurations to accommodate various surface metrology situations. One example configuration is shown in FIG. 3.

The self-focusing approach places the programmable display, such as a Flat Panel Display, in front of a self-focusing reflecting surface. Alongside the programmable display an imaging device such as a CCD camera is placed. The imaging camera is focused on the reflecting surface under test. The system 100 (see FIG. 4) controls the programmable display and the imaging device image is analyzed so as to measure the reflecting surface shape.

Figure 7:
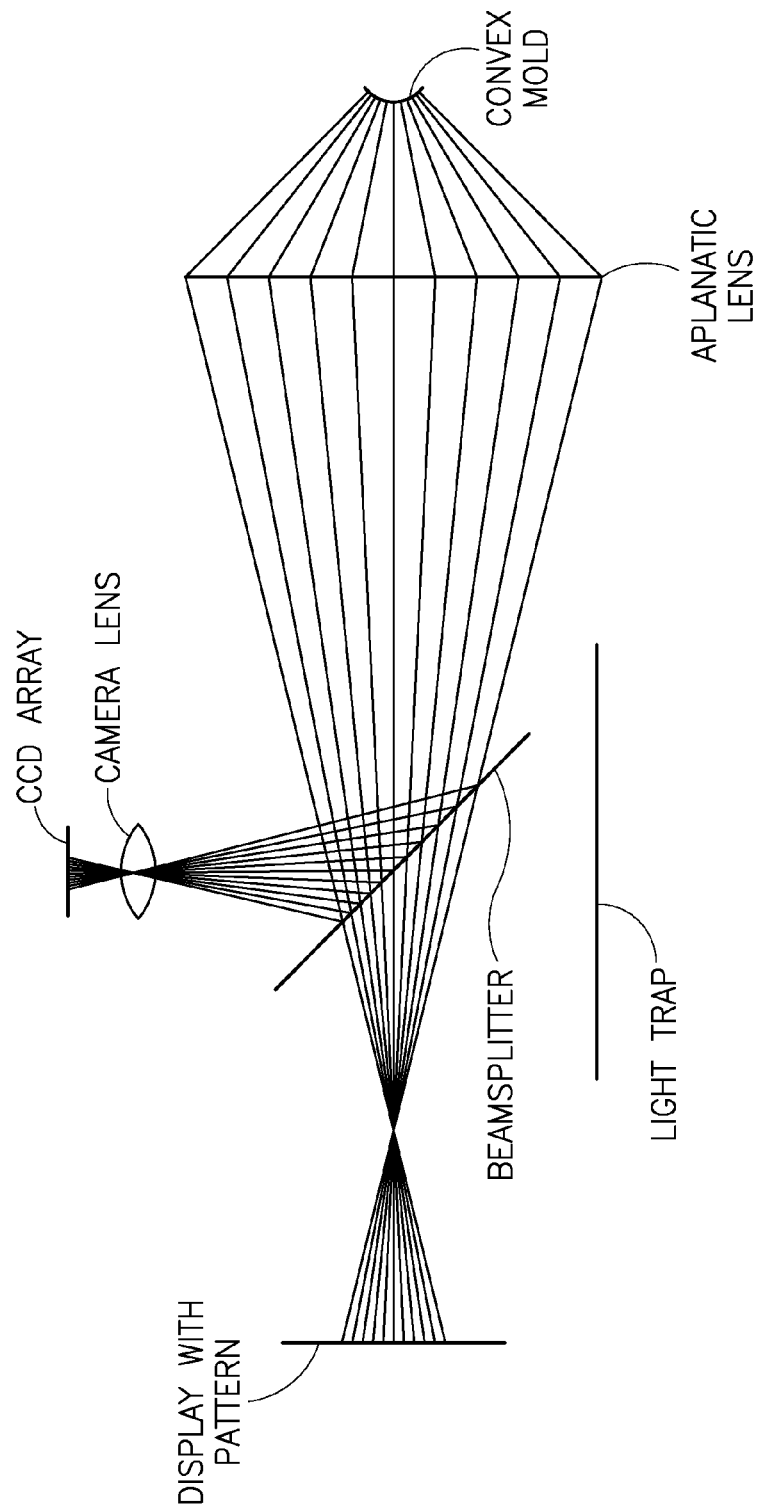
FIG. 7 illustrates light pathways taken by the present measurement system.

FIG. 7 illustrates an optical system employing an aplanatic lens with the system 100, where the optical system is configured so the aplanatic lens wavefront nominally matches the shape of the surface under test so that the screen image is mapped unto the specular surface, the system also collects the reflected wavefront off the specular surface. The system further consists of an imaging device that is focused on the specular surface. In this configuration the system 100 controls the programmable display 108 and the imaging device image is analyzed so as to measure the shape of the reflecting surface under test.

The embodiment in FIG. 7 also illustrates a difficulty in measuring surfaces with a large dispersion, such as a convex surface illustrated in FIG. 7, or an aspherical surface.

Figure 8:
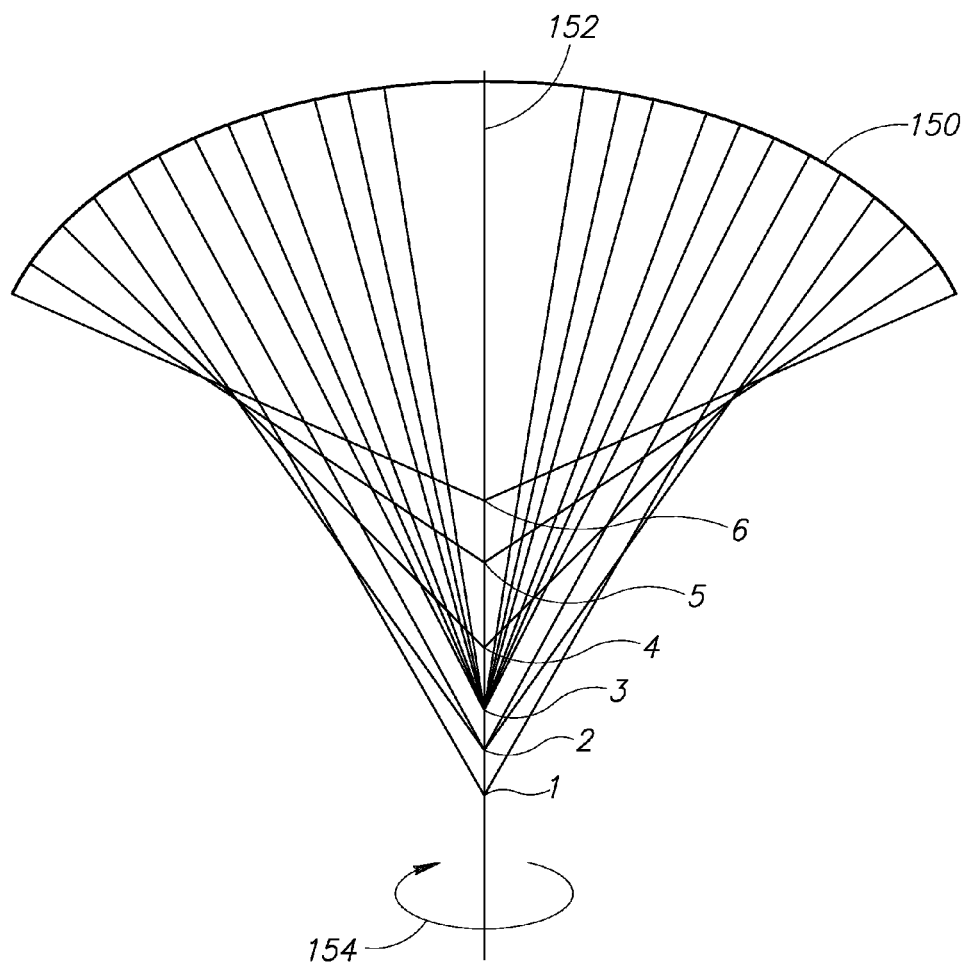
FIG. 8 illustrates an alternative measurement technique using axial scanning.

In an alternative embodiment, illustrated in FIG. 8, the display 108 and imaging device 110 are moved axially with respect to the surface. In FIG. 8, a concave lens 150 may have a large surface area or may have an irregular surface such that the entire surface of the lens 150 cannot be characterized with the display 108 and imaging device 110 in a fixed position with respect to the lens. In the example of the lens 150, an axis 152 extends upwardly from the lens surface. The display 108 and imaging device 110 are moved axially along the axis 152 to measure the lens one portion at a time. For example, at location 1, the system 100 can measure an annular portion of the lens for which light is reflected back from the display 108 to the imaging device 110. After a portion of the lens has been characterized, the relative position of the display 108 and imaging device 110 is changed to position 2 along the axis 152. The position controller 114 (see FIG. 4) can control the relative position between the system 100 and the lens 150. Those skilled in the art will appreciate that various components may be relocated in accordance with the present disclosure. For example, the display 108 can be moved by itself with the imaging device 110 remaining in a fixed position. Alternatively, the imaging device 110 can be moved while the display 108 remains in a fixed position. In yet another embodiment, both the display 108 and the imaging device 110 can be moved along the axis 152. Finally, both the display 108 and imaging device 110 can be maintained in a fixed position while the lens 150 itself is moved axially. The key to this measurement is that the relative position of the measurement system with respect to the lens 150 is changed. For example, if the display 108 and imaging device 110 are moved to location 2 along the axis 152, a different annular portion of the lens 150 can be characterized. As the measurement system 100 is successively moved to different locations along the axis 152, the measurement system is able to measure different annular portions of the lens 150. In this embodiment, the targets can include vertical and/or horizontal stripes and need not be limited to the two dimensional targets described above. Thus, axial scanning as illustrated is FIG. 8 can be used in situations where the asphericity is so great and the angular extent of the surface of the lens 150 so great that it is insufficient to gather all of the slope data in one axial plane location. That is, not all of the reflected pattern can be imaged over the whole aperture of the surface in one axial plane. However, the sliding axial scanning process illustrated in FIG. 8 allows the shifting of the measurement system to display spots and detect reflected spots from the entire surface one portion at a time.

The axial scanning process is particularly applicable to situations where the aspheric surface does not vary monotonically, but rather has areas where the curvature changes sign. This means that normals to the surface will cross the axis at widely different places so that detection of the display pattern at any one axial location is not possible, particularly if the surface being measured approaches a NA of one so that the axial scanning system illustrated in FIG. 8 is needed to introduce the illuminated pattern onto the surface of the lens 150. If the normals to the surface cross the axis 152 at widely different axial distances, the reflected rays will not go back through the aperture of the measurement system 100.

In the example of FIG. 8, an optical system that can illuminate the very edges of the surface of the lens 150 will not capture rays from the more central portions of the surface.

In yet another alternative embodiment, the measurement system 100 may be positioned along the axis 152 in FIG. 8 but rotated about an axis that extends perpendicularly from FIG. 8. For example, the measurement system could be positioned at location 1 on the axis 152 and rotated clockwise (or counterclockwise) as shown by the reference 154. At each rotational position, the imaging system 100 can characterize a portion of the lens 150. As the measurement system is rotated to a new rotational position, a different portion of the surface may thus be characterized. In this embodiment, the measurement system characterizes patches of the lens 150 rather than annular portions of the lens. As described above with axial scanning, the targets can include vertical and/or horizontal stripes and need not be limited to the two dimensional targets described above. However, the same principles of displaying a pattern and detecting a reflected pattern still apply.

Figure 3B:
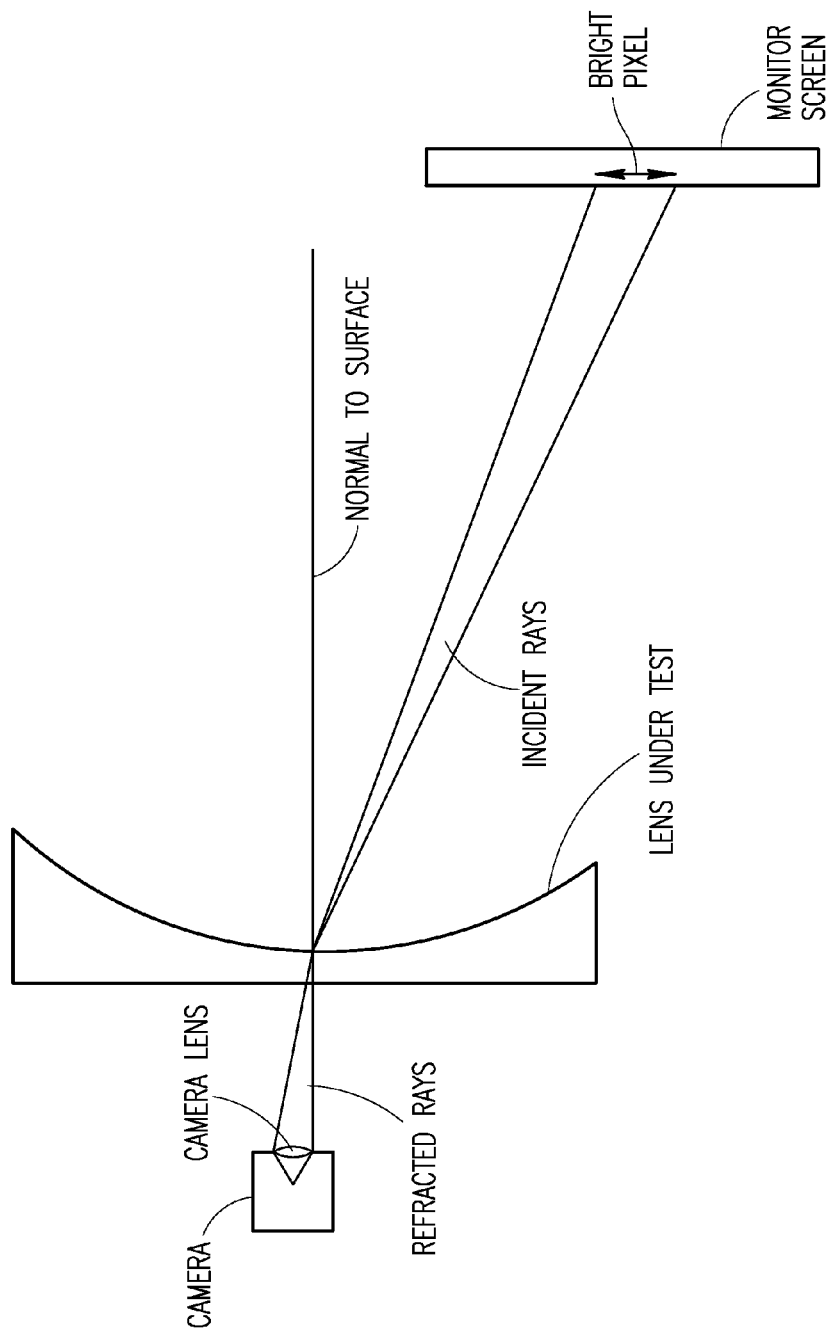
FIG. 3B illustrates an example embodiment of the present disclosure for a transmissive surface.

While all the examples given above use a reflective surface as the measurand, every aspect of the technology can be applied to the testing of refractive optics such as lens and lens systems, as illustrated in FIG. 3B. Further, in this case there are two configurations, a single pass and a double pass configuration. In the first the programmable screen 108 is placed on one side of the lens facing the lens and the imaging device 110 on the other side focused on the lens. The screen 108 is programmed to produce a pattern for the particular lens and distances from lens to screen and imaging device 110 so that a perfect lens will appear to have a perfectly regular pattern of spots and that deviations from perfect will result in the pattern that appears to the imaging device as irregular.

In the second configuration, the screen 108 and imaging device 110 are both on the same side of the lens and facing the lens. On the other side of the lens is a plane, or possibly curved, mirror, depending on the lens, that reflects the light back through the lens to the imaging device 110, again focused on the lens. Depending on the design, the display screen 108 and imaging device 110 may be side by side, or, as in the case of the just above, centered with respect to one another with the light being directed to the imaging device 110 by means of a beamsplitter, as illustrated in FIG. 7. All the features described for the reflecting surface apply as well to the refracting, or lens testing case.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A non-contact metrology system to measure a surface, comprising:
   a display positioned proximate a first side of the surface to be measured;
   a pattern generator configured to generate a pattern for display on the display, the pattern having a plurality of spot targets being arranged in two dimensions with each of the plurality of targets being separated from others of the plurality of targets in a first dimension and each of the plurality of targets being separated from others of the plurality of targets in a second dimension orthogonal to the first dimension;
   an imaging device positioned to detect at least a portion of the plurality of targets after interaction with the surface and to generate an electronic image thereof;
   an image analyzer configured to analyze the electronic image to determine if the plurality of targets in the electronic image are in expected locations in each of the two dimensions following interaction with the surface wherein the pattern generator is configured to generate the plurality of targets in an irregularly-spaced display pattern; and
   wherein the expected locations of the plurality of targets are in a regularly-spaced display pattern based on a location of the display with respect to the surface, a location of the imaging device with respect to the surface, and a shape of the surface.

2. The system of claim 1 wherein the image analyzer is configured to generate data indicative of the expected locations of the plurality of targets based on a location of the display with respect to the surface, a location of the imaging device with respect to the surface, the pattern on the display and a shape of the surface.

3. The system of claim 1 wherein the pattern generator is further configured to generate each of the plurality of targets in a different color.

4. The system of claim 3 wherein the image analyzer is further configured to use the color-coded plurality of targets to determine if the plurality of targets in the electronic image are in expected locations following interaction with the surface.

5. The system of claim 1 wherein the surface has an optical axis, the system further comprising a position controller configured to position the display and/or the imaging device at a plurality of positions along the axis to thereby scan a portion of the surface at each of the plurality of positions along the axis.

6. The system of claim 1 wherein the surface has an optical axis, the system further comprising a position controller configured to rotate the display and/or the imaging device at a plurality of positions about the axis to thereby scan a portion of the surface at each of the plurality of rotational positions.

7. The system of claim 1 wherein the surface has an optical axis, the system further comprising a position controller configured to rotate the surface at a plurality of positions about the axis to thereby scan a portion of the surface at each of the plurality of rotational positions.

8. The system of claim 1 wherein the plurality of targets are dots on the display.

9. The system of claim 1 wherein the surface is a specular surface and the interaction with the surface is a reflection of the plurality of targets from the surface, the imaging device being positioned on the first side of the surface.

10. The system of claim 1 wherein the surface is an optically transparent surface and the interaction with the surface is a refraction of the plurality of targets from the surface, the imaging device being positioned on the opposite side of the first surface.

11. A non-contact metrology system comprising:
    a programmable display screen that is programmed to display a pattern of targets such that when the screen is placed a known distance in front of a specular surface, the display screen will produce an array pattern of images reflected from the surface;
    an imaging device located proximate the display screen and focused on the surface, the imaging device configured to generate an output image to thereby provide slope information in two orthogonal directions based on a single output image; and
    a computing device configured to calculate the slopes of the surface and to integrate the slopes to give the surface topography.

12. The system of claim 11 wherein the pattern of targets on the
    display screen is programmed using an analytic description of the surface so that the reflected pattern from the surface is a regularly spaced pattern or grid of points as viewed by the imaging device.

13. The system of claim 11 wherein the pattern of targets on the display screen is programmed using an analytic description of the surface defined using a lens design program so that the reflected pattern from the surface is a regularly spaced pattern or grid of points as viewed by the imaging device.

14. The system of claim 11 wherein the pattern of targets on the display screen represents the surface as described by an analytic function and produces a regularly spaced set of points reflected off the surface as viewed in the imaging device output image if the surface matches the surface as described by the analytic function, but where irregular spacing in the imaging device output image represents errors in the topography of the surface, the irregular spacing being indicative of slope errors in the surface, the computing device being further configured to integrate the slope errors to recover the surface topography.

15. The system of claim 14 wherein the surface has a circular outline and the computing device is further configured to use a Zernike vector polynomial for the analysis.

16. The system of claim 11 where the targets on the display screen are color coded and the output image generated by the imaging device includes color coding, the computing device being further configured to use the color coding to identify individual spots so there is no ambiguity between which spot on the display screen corresponds to which spot reflected by the surface and captured by the imaging system.

17. The system of claim 11 where the targets on the display screen are intensity coded and the output image generated by the imaging device includes intensity coding, the computing device being further configured to use the intensity coding to identify individual spots so there is no ambiguity between which spot on the display screen corresponds to which spot reflected by the surface and captured by the imaging system.

18. The system of claim 11 where the targets on the display screen are size coded and the output image generated by the imaging device includes size coding, the computing device being further configured to use the size coding to identify individual spots so there is no ambiguity between which spot on the display screen corresponds to which spot reflected by the surface and captured by the imaging system.

19. The system of claim 11 where the targets on the display screen are shape coded and the output image generated by the imaging device includes shape coding, the computing device being further configured to use the shape coding to identify individual spots so there is no ambiguity between which spot on the display screen corresponds to which spot reflected by the surface and captured by the imaging system.

20. The system of claim 11 where the targets on the display screen are motion coded with unique motions and the output image generated by the imaging device includes motion coding, the computing device being further configured to use the motion coding to identify individual spots so there is no ambiguity between which spot on the display screen corresponds to which spot reflected by the surface and captured by the imaging system.

21. The system of claim 11 where the targets on the display screen are arranged to provide a null test of an aspheric surface or lens such that the spots reflected from the aspheric surface are a regularly spaced grid of points as viewed by the imaging device.

22. The system of claim 11 where the pattern of targets on the display screen are reprogrammed to move and reconfigure the pattern of targets to take into account a misalignment of the surface with respect to the original pattern of targets on the display screen to thereby electronically realign the test to match the physical location of the surface without actually moving the surface.

23. The system of claim 11 wherein the number of targets on the display screen pattern is directly related to the spatial sampling of the surface topography such that more targets in the pattern of targets results better sampling of the surface.

24. A non-contact metrology system comprising:
a programmable display screen, placed at a known location in front of a specular surface, that is programmed to display a pattern of targets one target at a time in two orthogonal directions and to move each target so that its reflection from the surface forms an evenly spaced grid;
an imaging device located proximate the display screen and focused on the surface, the imaging device configured to generate an output image to thereby provide slope information; and
a computing device configured to calculate the slopes of the surface and to integrate the slopes to give the surface topography.

25. A non-contact metrology system comprising:
a programmable display screen that is programmed to display a pattern of targets such that, when the screen is placed a known distance in front of a refracting lens or optical system, the screen will produce an array pattern of rays refracted in the lens or optical system;
an imaging device located a known distance from the lens or optical system and focused on the lens or optical system, the imaging device generating an output image to thereby provide slope information; and
a computing device configured to calculate the slopes of the rays produced by the lens and to integrate the slopes to give the shape of the wavefront emanating from the lens or optical system.

26. The system of claim 25 wherein the pattern of targets is used to determine the slope of the rays produced by the lens of the using the law of refraction in two orthogonal directions simultaneously, or in one frame of data.

27. The system of claim 25 wherein the pattern of targets on the display screen is programmed using an analytic description of the lens or optical system defined using a lens design program so that the refracted pattern from the surface is a regularly spaced pattern or grid of points as viewed by the imaging device.

28. The system of claim 25 wherein the pattern of targets on the display screen represents an ideal lens or optical system as determined by a lens design program and produces a regularly spaced set of points on the lens as viewed in the imaging device but where irregular spacing represents errors in the topography of the perfect lens, and that the errors in the pattern represent slope errors in the rays emanating from the lens and that these slopes errors can be integrated to recover the surface topography.

29. The system of claim 25 wherein the number of targets on the display screen pattern is directly related to the spatial sampling of the lens topography such that more targets in the pattern of targets results better sampling of the lens.

30. The system of claim 25 where the targets on the display screen are color coded and the output image generated by the imaging device includes color coding, the computing device being further configured to use the color coding to identify individual spots so there is no ambiguity between which spot on the display screen corresponds to which spot refracted by the lens and captured by the imaging system.

31. The system of claim 25 where the pattern of targets on the display screen are reprogrammed to move and reconfigure the pattern of targets to take into account a misalignment of the lens with respect to the original pattern of targets on the display screen to thereby electronically realign the test to match the physical location of the lens without actually moving the lens.

32. A non-contact metrology method to measure a surface, comprising:
positioning a display proximate a first side of the surface to be measured;
generating a pattern for display on the display, the pattern having a plurality of targets in two dimensions with each of the plurality of targets being separated from others of the plurality of targets in two dimensions;
generating an image of at least a portion of the plurality of targets after interaction with the surface; and
analyzing the image to determine if the plurality of targets in the image are in expected locations following interaction with the surface wherein generating a pattern for display on the display comprises generating the plurality of targets in an irregularly-spaced display pattern and the expected locations are in a regularly-spaced display pattern following interaction with the surface.

33. The method of claim 32 wherein generating a pattern for display on the display comprises generating the plurality of targets in a different color.

34. The method of claim 32 wherein the surface has an optical axis, the method further comprising performing a first measurement of a first portion of the surface from a first position along the optical axis and, following the first measurement, moving at least one of the display, a device generating the image, or the surface along the optical axis to a second position, and performing a second measurement of a second portion of the surface from the second position along the optical axis.

35. The method of claim 32 wherein the surface has an optical axis, the method further comprising performing a first measurement of a first portion of the surface from a first angular position on the optical axis and, following the first measurement, rotating at least one of the display, a device generating the image, or the surface about the optical axis to a second angular position, and performing a second measurement of a second portion of the surface from the second angular position.

36. The method of claim 32 wherein the plurality of targets are dots on the display.

37. The method of claim 32 wherein the surface is a specular surface and the interaction with the surface is a reflection of the plurality of targets from the surface, and a device generating the image being positioned on the first side of the surface.

38. The method of claim 32 wherein the surface is an optically transparent surface and the interaction with the surface is a refraction of the plurality of targets from the surface, and a device generating the image being positioned on the opposite side of the first surface.

39. The method of claim 32 wherein the surface is a first surface, the method further comprising saving the pattern for display on the display and using the saved pattern on the display to measure a second surface that is supposed to be the same as the first surface to thereby determine deviations from the first surface.

40. The system of claim 11 wherein the specular surface has an optical axis, the system further comprising a position controller configured to position the display screen and/or the imaging device at a plurality of positions along the axis to thereby scan a portion of the specular surface at each of the plurality of positions along the axis.

41. The system of claim 11 wherein the specular surface has an optical axis, the system further comprising a position controller configured to rotate the display screen and/or the imaging device at a plurality of positions about the axis to thereby scan a portion of the specular surface at each of the plurality of rotational positions.

42. The system of claim 11 wherein the specular surface has an optical axis, the system further comprising a position controller configured to rotate the specular surface at a plurality of positions about the axis to thereby scan a portion of the specular surface at each of the plurality of rotational positions.

43. The system of claim 24 wherein the specular surface has an optical axis, the system further comprising a position controller configured to position the display screen and/or the imaging device at a plurality of positions along the axis to thereby scan a portion of the specular surface at each of the plurality of positions along the axis.

44. The system of claim 24 wherein the specular surface has an optical axis, the system further comprising a position controller configured to rotate the display screen and/or the imaging device at a plurality of positions about the axis to thereby scan a portion of the specular surface at each of the plurality of rotational positions.

45. The system of claim 24 wherein the specular surface has an optical axis, the system further comprising a position controller configured to rotate the specular surface at a plurality of positions about the axis to thereby scan a portion of the specular surface at each of the plurality of rotational positions.

46. The system of claim 25 wherein the refracting lens or optical system has an optical axis, the system further comprising a position controller configured to position the display screen and/or the imaging device at a plurality of positions along the axis to thereby scan a portion of the refracting lens or optical system at each of the plurality of positions along the axis.

47. The system of claim 25 wherein the refracting lens or optical system has an optical axis, the system further comprising a position controller configured to rotate the display screen and/or the imaging device at a plurality of positions about the axis to thereby scan a portion of the refracting lens or optical system at each of the plurality of rotational positions.

48. The system of claim 25 wherein the refracting lens or optical system has an optical axis, the system further comprising a position controller configured to rotate the refracting lens or optical system at a plurality of positions about the axis to thereby scan a portion of the refracting lens or optical system at each of the plurality of rotational positions.

49. The method of claim 32 wherein generating an image is performed by an imaging device and the surface has an optical axis, the method further comprising positioning the display and/or the imaging device at a plurality of positions along the axis and generating an image of a portion of the surface at each of the plurality of positions along the axis.

50. The method of claim 32 wherein generating an image is performed by an imaging device and the surface has an optical axis, the method further comprising rotating the display and/or the imaging device at a plurality of positions about the axis and generating an image of a portion of the surface at each of the plurality of rotational positions.

51. The method of claim 32 wherein generating an image is performed by an imaging device and the surface has an optical axis, the method further comprising rotating the surface at a plurality of positions about the axis and generating an image of a portion of the surface at each of the plurality of rotational positions.

52. A non-contact metrology system to measure a surface having an optical axis, comprising:
   a display positioned proximate a first side of the surface to be measured;
   a pattern generator configured to generate a pattern for display on the display, the pattern having a plurality of spot targets being arranged in two dimensions with each of the plurality of targets being separated from others of the plurality of targets in two dimensions;
   an imaging device positioned to detect at least a portion of the plurality of targets after interaction with the surface and to generate an electronic image thereof;
   a position controller configured to position the display and/or the imaging device at a plurality of positions along the optical axis to permit the imaging device to detect at least a portion of the plurality of targets after interaction with a portion of the surface at each of the plurality of positions along the axis; and
   an image analyzer configured to analyze the electronic image to determine if the plurality of targets in the electronic image are in expected locations following interaction with the surface.

53. A non-contact metrology system to measure a surface having an optical axis, comprising:
   a display positioned proximate a first side of the surface to be measured;
   a pattern generator configured to generate a pattern for display on the display, the pattern having a plurality of spot targets being arranged in two dimensions with each of the plurality of targets being separated from others of the plurality of targets in two dimensions;

an imaging device positioned to detect at least a portion of the plurality of targets after interaction with the surface and to generate an electronic image thereof;

a position controller configured to rotate the display and/or the imaging device to a plurality of positions about the axis to permit the imaging device to detect at least a portion of the plurality of targets after interaction with a portion of the surface at each of the plurality of rotational positions; and an image analyzer configured to analyze the electronic image to determine if the plurality of targets in the electronic image are in expected locations following interaction with the surface.

54. A non-contact metrology system to measure a surface having an optical axis, comprising:

a display positioned proximate a first side of the surface to be measured;

a pattern generator configured to generate a pattern for display on the display, the pattern having a plurality of spot targets being arranged in two dimensions with each of the plurality of targets being separated from others of the plurality of targets in two dimensions;

an imaging device positioned to detect at least a portion of the plurality of targets after interaction with the surface and to generate an electronic image thereof;

a position controller configured to rotate the surface to a plurality of positions about the axis to permit the imaging device to detect at least a portion of the plurality of targets after interaction with a portion of the surface at each of the plurality of rotational positions; and an image analyzer configured to analyze the electronic image to determine if the plurality of targets in the electronic image are in expected locations following interaction with the surface.

* * * * *